Nov. 5, 1968     L. M. BIGGS, JR     3,408,935
FLEXIBLE LINE DELIVERY METHOD AND DEVICE FOR CHEMICAL
AND INCAPACITATING AGENTS
Filed Aug. 18, 1964

INVENTOR.
LAWRENCE M. BIGGS, JR.
BY
P. H. Fisht
ATTORNEY.

3,408,935
FLEXIBLE LINE DELIVERY METHOD AND DEVICE FOR CHEMICAL AND INCAPACITATING AGENTS
Lawrence M. Biggs, Jr., China Lake, Calif., assignor to the United States of America as represented by the Secretary of the Navy
Filed Aug. 18, 1964, Ser. No. 390,787
3 Claims. (Cl. 102—4)

The invention described herein may be manufactured and used by or for the Government of the United States of America for governmental purposes without the payment of any royalties thereon or therefor.

The present invention relates generally to warheads and more particularly to a method and a device for delivering and dispersing incapacitating agents through the use of elongated, flexible explosive charges initiated at or above ground level.

Those concerned with the development of chemical agent dispensers, for dispensing incapacitating agents in denied areas, have found presently known methods and devices inadequate for achieving optimum results. The known methods and devices fail to provide sufficient area coverage with uniform concentration. This is particularly true where massive point-source dispensing or dispersing devices are utilized, primarily because of the natural inability of explosive mechanisms to achieve the differential particle velocity gradients necessary for obtaining maximum area coverage. Frequently, the area immediately adjacent to a massive point-source dispensing weapon receives such high dosage concentrations as to "overkill" the area, while peripheral areas receive inadequate dosages.

Various attempts have been made to devise techniques which utilize cluster type weapons in order to achieve the desired dosage uniformity and increased area coverage. However, the use of cluster type weapons is severely limited by inherent restrictions imposed on the delivery modes therefor. For example, such weapons must be delivered by aircraft operating at relatively high altitudes in attempting to achieve effective weapon dispersion. Consequently high pilot and aircraft attrition rates may be expected, since the aircraft will be exposed to excessive enemy controlled firepower. Further, the use of multiple bomblets reduces the total effective quantity of agent that may be disseminated per aircraft sortie.

Spray tank dispensing devices also have been found inadequate as the transporting aircraft is required to operate over a target area at very low altitudes in order to effectively disperse the agent. Consequently the delivery aircraft must experience excessive ground-fire. Furthermore, some known agents are considered to be too volatile to be dispensed by the spray tank method. Additionally, spray-tank dispensing techniques are limited by the necessity of obtaining accurate placement, a limitation common to all heretofore known chemical agent dispensing or dispersing techniques, and thus further limitations are imposed when selecting target areas.

The purpose of the present invention is to provide a method and means for delivering and dispersing large quantities of incapacitating agents, either lethal or nonlethal, which overcomes the aforementioned disadvantages.

An object of the instant invention is to provide a simple, and economical warhead, which may be projected over a given area and detonated near ground level to effectively disperse predetermined quantities of incapacitating agents over a wide area with increased dosage uniformity.

Another object is to provide a simple and efficient method of dispersing incapacitating agents over inaccessible areas.

Other objects, advantages and novel features of the invention will become apparent from the following detailed description of the invention when considered in conjunction with the accompanying drawings wherein:

FIG. 1 is a diagrammatic view of one embodiment of the instant invention, illustrating a dispersing operation of a plurality of flexible incapacitating agent containers;

FIG. 2 is a partial vertical cross section, on an enlarged scale, of a portion of a single one of the plurality of flexible agent containers shown in FIG. 1, illustrating the arrangement of an explosive charge disposed within the container;

FIG. 3 is a vertical cross section of the device of FIG. 1, on an enlarged scale, illustrating one manner in which the device of the instant invention may be transported by an attacking aircraft; and FIG. 4 is a partial cross section taken generally at 4 in FIG. 3.

Turning now to drawings, wherein like reference characters designate like or corresponding parts throughout the several views, there is shown in FIG. 1 an air-launched missile 10 trailing a plurality of exploding incapacitating agent containers 11, which are being acted upon be parachutes 12 attached to the aft or trailing ends thereof.

Turning now to FIG. 2, each flexible container 11 comprises a flexible tubular liner or housing 13, a selected incapacitating agent 14 and a flexible extruded explosive burster charge 15. The liner 13 may be made from any one of a number of suitable materials capable of retaining the agent 14 and being ruptured by the charge 15. However, it is required that the liner 13 be flexible in order to function in its intended manner. Therefore, the material utilized in forming the liner 13 may be one of the synthetic plastic fabrics, such as, for example, pliable nylon, which has a high tensile strength but which may be ruptured by exploding the burster charge 15.

The particular incapacitating agent 14 utilized to fill the container 11 may be varied according to the purposes for which the device is to be utilized. Although variable, the form of the agent is preferably one which is fluent with particles thereof capable of achieving acceleration under the influence of shock waves generated through exploding the burster charge 15.

The burster charge 15 may comprise a shaped charge of any suitable flexible design and composition capable of rupturing the liner 13 and dispersing the agent 14. The burster charge 15 may, if desired, comprise a linear explosive charge of a type similar to that disclosed in U.S. Letters Patent 2,511,005, issued June 13, 1950, which includes a flexible casing filled with an explosive compound and associated with a detonating cord for initiating the explosive compound.

Numerous means may be employed to deliver the warhead 10. Such means may include ground or air-launched rocket propelled devices, which, in flight, trail the container 11 behind the rocket motor, cluster bomb dispersing devices of various types and designs, and free-fall devices of the types employing aerial cargo delivery techniques.

Where found desirable to employ "toss-bombing" or "loft-bombing" techniques, wherein a pilot approaches the target, launches the warhead and turns away from the target without passing thereover, a device 10, such as that depicted in FIG. 3 may be employed.

The device 10 merely serves to illustrate one of the types of devices that may be employed. Briefly the device 10 comprises an aerodynamic housing 20, which is provided with external bomb-rack lugs 21 and a frangible release closure 22. Hence, the housing 20 may be secured to an external bomb-rack of an attacking aircraft A and released in a conventional manner as the pilot turns away from the target in a conventional maneuver.

Mounted on structural support members 23, arranged in the forward portion of the housing 20, is a fuze 24. The fuze 24 may be of any suitable design, such as, for example, timing fuzes, impact fuzes and proximity fuzes of various types. The fuze 24 may comprise a timing fuze having a suitable initiating device normally connected to a transporting aircraft A by means of a static line 25, which serves to actuate the fuze 24 as the housing 20 is separated from the attacking aircraft and the line 25 is separated from the container 20.

As illustrated, a plurality of coiled containers 11 are coiled in a suitable manner and stowed within the housing 20. The burster charge 15 of each container 11 is connected with the fuze 24, while the forward end of the container 11 is secured to the structural supports 23 by a suitable clamping ring 26. Mounted within the housing 20, at its aft section, is a plurality of collapsed parachutes 12, each being connected with the aft end of one of the containers 11 through shroud lines 12*a*, coupled to the container 11 in any suitable manner, such as, for example, a collar fixed to the liner 13.

The parachutes 12 may be initially withdrawn from the housing 20 and deployed in any suitable manner. As illustrated in FIG. 3, the parachutes 12 are to be deployed by means of aircraft-attached static lines 27 extending through the frangible cover 22 and attached to the parachutes 12, whereby the parachutes 12 may be extracted from the housing 20 as the warhead falls free of the launching aircraft. The cover 22 is of any suitable design, however, it is preferred that the cover 22 be adapted to be ruptured as the lines 27 are drawn taut. It is intended that lines 27 be adapted to part in a conventional manner as tension of a predetermined value is applied thereto so that the parachutes 12 may be deployed and separated from the attacking aircraft A.

The number of containers 11 provided for each device 10 may be varied as found desirable to perform a specific purpose. Further, it may be found desirable to connect each of the parachutes 12 to the other, in order to obviate undesired aerodynamic drag effects and prevent unnecessary fouling of the shrouds 12*a* as the containers 11 are caused to assume a desired delivery disposition.

In operation, the warhead, including the missile 10, the parachute 12, and the containers 11 are ejected from an attacking aircraft A and the parachutes 12 deployed through the effect of the static lines 27 so that the containers 11 may be disposed behind the propelling device or missile 10 as the parachutes 12 act thereon and caused to assume the configuration depicted in FIG. 1. At a determinable point in time the fuze 24 is activated for causing the detonator of the burster charge 15 to initiate the burster charge, whereupon the burster charge 15 is exploded for thereby causing the lines 13 to rupture and the particles of incapacitating agent 14 to be dispersed in a predetermined cloud pattern, as determined by the acceleration imparted to the particles by the shock waves of the explosion and the altitude at which the fuze 24 is activated for causing the burster charges 15 to explode.

Obviously many modifications and variations of the present invention are possible in the light of the above teachings. It is therefore to be understood that within the scope of the appended claims the invention may be practiced otherwise than as specifically described.

What is claimed is:

1. A flexible, tubular warhead for delivering and dispersing an incapacitating agent above a given surface, comprising in combination:

a flexible, tubular container of a first given diameter, formed of a uniformly rupturable fabric, and having opposite ends defining leading and trailing container ends;

a fluent, non-explosive incapacitating agent uniformly disposed within said container in a manner such as to substantially fill the container;

an elongated flexible explosive charge of a second given diameter disposed within said agent in coaxial alignment with said container adapted to explode and thereby rupture said container and disperse said agent;

a propelling device connected with the leading end of said container adapted to act thereon to propel the container in trailing fashion through an arcuate trajectory;

an aerodynamic drag device connected with the trailing end of said container adapted to create an aerodynamic drag effect acting in opposition to said propelling device at the trailing end of said container, whereby said propelling device and the leading end of said container may be caused to precede the trailing end of said container as the container is propelled along its trajectory; and a detonating device arranged in said propelling means and connected with said charge adapted to detonate said charge at a predetermined altitude with respect to said given surface, whereby the charge may be exploded and the incapacitating agent dispersed above the surface.

2. The warhead as defined in claim 1 being further characterized in that said aerodynamic drag device comprises:

a flexible member adapted to be collapsed for purposes of handling said warhead and expanded for purposes of acting on said container; and means connecting said device with the trailing end of said container.

3. The warhead as defined in claim 2 being further characterized in that said propelling device comprises:

a projectile; and means for connecting said leading end of the container with said projectile.

References Cited

UNITED STATES PATENTS

| | | | |
|---|---|---|---|
| 1,791,716 | 2/1931 | Davis et al. | 102—6 |
| 2,274,655 | 3/1942 | Bickel | 102—9 |
| 2,377,587 | 6/1945 | Strong | 102—4 |
| 2,543,057 | 2/1951 | Porter | 102—24 |
| 3,064,568 | 11/1962 | Ainslie et al. | 102—4 |
| 3,087,427 | 4/1963 | Thorildsson | 102—22 X |

SAMUEL W. ENGLE, *Primary Examiner.*

B. A. BORCHELT, *Assistant Examiner.*